(12) United States Patent
Baier et al.

(10) Patent No.: US 11,186,280 B2
(45) Date of Patent: Nov. 30, 2021

(54) METHOD AND DISTANCE CONTROLLER FOR CONTROLLING A DISTANCE OF A VEHICLE TO A PRECEDING VEHICLE

(71) Applicant: Robert Bosch GmbH, Stuttgart (DE)

(72) Inventors: Sebastian Baier, Munich (DE); Thorsten Schori, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 159 days.

(21) Appl. No.: 16/260,398

(22) Filed: Jan. 29, 2019

(65) Prior Publication Data
US 2019/0232961 A1  Aug. 1, 2019

(30) Foreign Application Priority Data

Jan. 29, 2018 (DE) .......................... 102018201306.3

(51) Int. Cl.
*B60W 30/16* (2020.01)
*B60W 50/10* (2012.01)

(52) U.S. Cl.
CPC .......... *B60W 30/162* (2013.01); *B60W 50/10* (2013.01); *B60W 2540/10* (2013.01); *B60W 2754/30* (2020.02)

(58) Field of Classification Search
CPC ............... B60W 30/162; B60W 50/10; B60W 2754/30; B60W 2540/10; B60W 2554/802; B60W 2540/215; B60W 50/085; B60W 30/16; B60W 2540/106; B60W 2554/801; B60K 2031/0025
See application file for complete search history.

(56) References Cited

U.S. PATENT DOCUMENTS

| | | | | |
|---|---|---|---|---|
| 4,628,317 | A * | 12/1986 | Nishikawa | B60W 30/1819 340/903 |
| 2002/0111733 | A1 * | 8/2002 | Akabori | B60W 30/16 701/96 |
| 2008/0255746 | A1 * | 10/2008 | Hellmann | B60W 30/16 701/96 |
| 2011/0276246 | A1 * | 11/2011 | Kuze | B60W 10/06 701/96 |
| 2017/0240177 | A1 * | 8/2017 | Fujii | B60W 50/082 |

OTHER PUBLICATIONS

Shladover, Steven; Nowakowski, Christopher; Lu, Xiao-Yun, Using Cooperative Adaptive Cruise Control (CACC) to Form High-Performance Vehicle Streams, Jun. 2014, University of California, Berkley, pp. 8-10 (Year: 2014).*

* cited by examiner

*Primary Examiner* — Aniss Chad
*Assistant Examiner* — Chase L Cooley
(74) *Attorney, Agent, or Firm* — Norton Rose Fulbright US LLP; Gerard Messina

(57) ABSTRACT

A method for controlling a distance of a vehicle to a preceding vehicle, characterized in that, in a step of limiting, the distance is limited to a preselected distance target value and, in a step of setting, the distance target value is set using a change of an accelerator pedal angle.

10 Claims, 2 Drawing Sheets

METHOD AND DISTANCE CONTROLLER FOR CONTROLLING A DISTANCE OF A VEHICLE TO A PRECEDING VEHICLE

FIELD OF THE INVENTION

The present invention relates to a method for controlling a distance of a vehicle to a preceding vehicle and a distance controller for a vehicle.

BACKGROUND INFORMATION

A distance limiter for a vehicle maintains a distance between the vehicle and a preceding vehicle at a fixed minimum distance by braking interventions and interventions in acceleration requests placed via an accelerator pedal. When the limiter is switched on, acceleration requests are ignored which would be capable of reducing the distance below the minimum distance.

SUMMARY

Against this background, the approach presented here provides a method for controlling a distance of a vehicle to a preceding vehicle and a distance controller, and finally a corresponding computer program product.

Specific embodiments of the present invention may advantageously enable a distance to a preceding vehicle to be adapted appropriately for the situation, without falling below a safety distance. A natural driving experience may thus be achieved and, for example, the momentum of a vehicle may be maintained when the preceding vehicle decelerates to turn.

A method for controlling a distance of a vehicle to a preceding vehicle is provided, which is characterized in that, in a step of limiting, the distance is limited to a preselected distance target value, and in a step of setting, the distance target value is set using a piece of information about a change of an accelerator pedal angle.

Ideas for specific embodiments of the present invention may be considered to be based, inter alia, on the concepts and findings described hereafter.

The distance target value may be a distance between a vehicle and a directly preceding vehicle, which is generally not to be undershot. The distance target value is to be at least as large as a safety distance, so as not to endanger the safety of both vehicles traveling one behind the other in all traffic situations, for example, in the event of an abrupt deceleration of the preceding vehicle. In order to enhance a safety feeling in a driver, for example, the distance target value may also be selected to be greater than the safety distance, however. In particular, it may be advantageous to be able to set the distance target value individually to driver requirements. The distance target value may be dependent on a velocity of the vehicle. At higher velocity, the distance target value may be greater than at low velocity. The distance target value may be reduced at most down to a velocity-dependent safety distance. The safety distance may be specified, for example, by a reaction time of an emergency braking system or a driver of the vehicle.

While a distance target value is fixedly specified in conventional distance limiters, an option is to be provided by the distance controller presented here of being able to adapt the distance target value dynamically to the wishes of the driver within certain limits. In particular, a piece of information about a change of the accelerator pedal angle is to be taken into consideration when setting the distance controller.

The accelerator pedal angle indicates in this case how far the accelerator pedal of the vehicle is pressed down by the driver starting from a rest position. Changes of the accelerator pedal angle are thus an indication of the instantaneous acceleration intention of the driver. For example, if the accelerator pedal angle is increased by the driver, this may be understood as an indication to the distance controller to temporarily reduce the distance target value to be maintained, i.e., to drive closer up to the preceding vehicle.

In the step of limiting, the piece of information about the change of the accelerator pedal angle may be relayed only proportionately to a drive, for example, if the distance is limited to the distance target value. In particular, an increase of the accelerator pedal angle may be relayed only proportionately to the drive. A reduction of the accelerator pedal angle may be relayed completely to the drive.

The method may include a step of presetting, in which the distance target value is preset using a reference value for the distance target value input by an operating element of the vehicle. The distance target value may be preset before the vehicle comes into the vicinity of the preceding vehicle. An operating element may be, for example, a lever on a steering column or a steering wheel of the vehicle. The reference value may be understood as a guide value for the distance to be limited. Various reference values may be set at the operating element. Each reference value represents a different initial distance target value. Proceeding from the initial distance target value, the distance target value is then set in the step of setting using the change of the accelerator pedal angle.

The distance target value may be preset using a velocity-independent time gap value as the reference value. The time gap value represents a duration which elapses until the vehicle passes the same point as the preceding vehicle. The actual distance to be maintained thus becomes greater with increasing velocity and less with decreasing velocity, without the reference value being changed.

The reference value may be changed by a predefined step if a gradient of the accelerator pedal angle is greater than a threshold value. If the accelerator pedal is rapidly depressed or released, a higher gradient of the accelerator pedal angle results. If the accelerator pedal is rapidly depressed, a smaller reference value than at the operating element may be set. The distance between the vehicles is reduced rapidly without falling below the minimum safety distance for the traveled velocity. If the accelerator pedal is rapidly released, a greater reference value than at the operating element may be set. The vehicle decelerates due to the release of the accelerator pedal and the distance increases. The deceleration may be assisted by a slight brake intervention.

The distance target value may be reduced if the accelerator pedal angle is increased. If the accelerator pedal is depressed at a low speed, the change of the accelerator pedal angle may be relayed proportionately to the drive of the vehicle. The vehicle then slowly closes the gap to the preceding vehicle and maintains this distance.

The distance target value may be increased if the accelerator pedal angle is reduced. If the accelerator pedal is released at a low speed or a force on the accelerator pedal is slowly reduced, the change of the accelerator pedal angle may be relayed proportionately to the drive of the vehicle. The vehicle falls back slowly behind the preceding vehicle. The distance may be kept constant again from the distance target value specified via the reference value.

An intervention leeway for an actuation unit of the vehicle may be specified using the instantaneous distance target value. The smaller the distance target value is, the stronger may brake interventions and/or changes of the acceleration request be. In other words, the vehicle may be braked harder the closer it comes to the preceding vehicle.

The method may be implemented in a control unit, for example, in software or hardware or in a mixed form of software and hardware, for example.

The approach presented here furthermore provides a distance controller which is designed to carry out, actuate, or implement the steps of a variant of the method presented here in corresponding units.

The distance controller may be an electrical device including at least one processing unit for processing signals or data, at least one memory unit for storing signals or data, and at least one interface and/or one communication interface for inputting or outputting data which are embedded in a communication protocol. The processing unit may be, for example, a signal processor, a so-called system ASIC, or a microcontroller for processing sensor signals and outputting data signals as a function of the sensor signals. The memory unit may be, for example, a flash memory, an EPROM, or a magnetic memory unit. The interface may be designed as a sensor interface for inputting the sensor signals from a sensor and/or as an actuator interface for outputting the data signals and/or control signals to an actuator. The communication interface may be designed to input or output the data in a wireless and/or wired manner. The interfaces may also be software modules which are present, for example, on a microcontroller in addition to other software modules.

A computer program product or computer program having program code, which may be stored on a machine-readable carrier or storage medium such as a semiconductor memory, a hard drive memory, or an optical memory and is used to carry out, implement, and/or actuate the steps of the method as per one of the above-described specific embodiments is also advantageous, in particular if the program product or program is executed on a computer, a programmable control unit, or a similar device.

It is to be noted that some of the possible features and advantages of the present invention are described herein with reference to different specific embodiments as methods for controlling a distance and as distance controllers. Those skilled in the art recognize that the features may be combined, adapted, or exchanged in a suitable manner to arrive at other specific embodiments of the present invention.

BRIEF DESCRIPTION OF THE DRAWINGS

The figures are solely schematic and are not true to scale. Identical reference numerals identify identical or identically-acting features in the figures.

DETAILED DESCRIPTION

Figure 1:
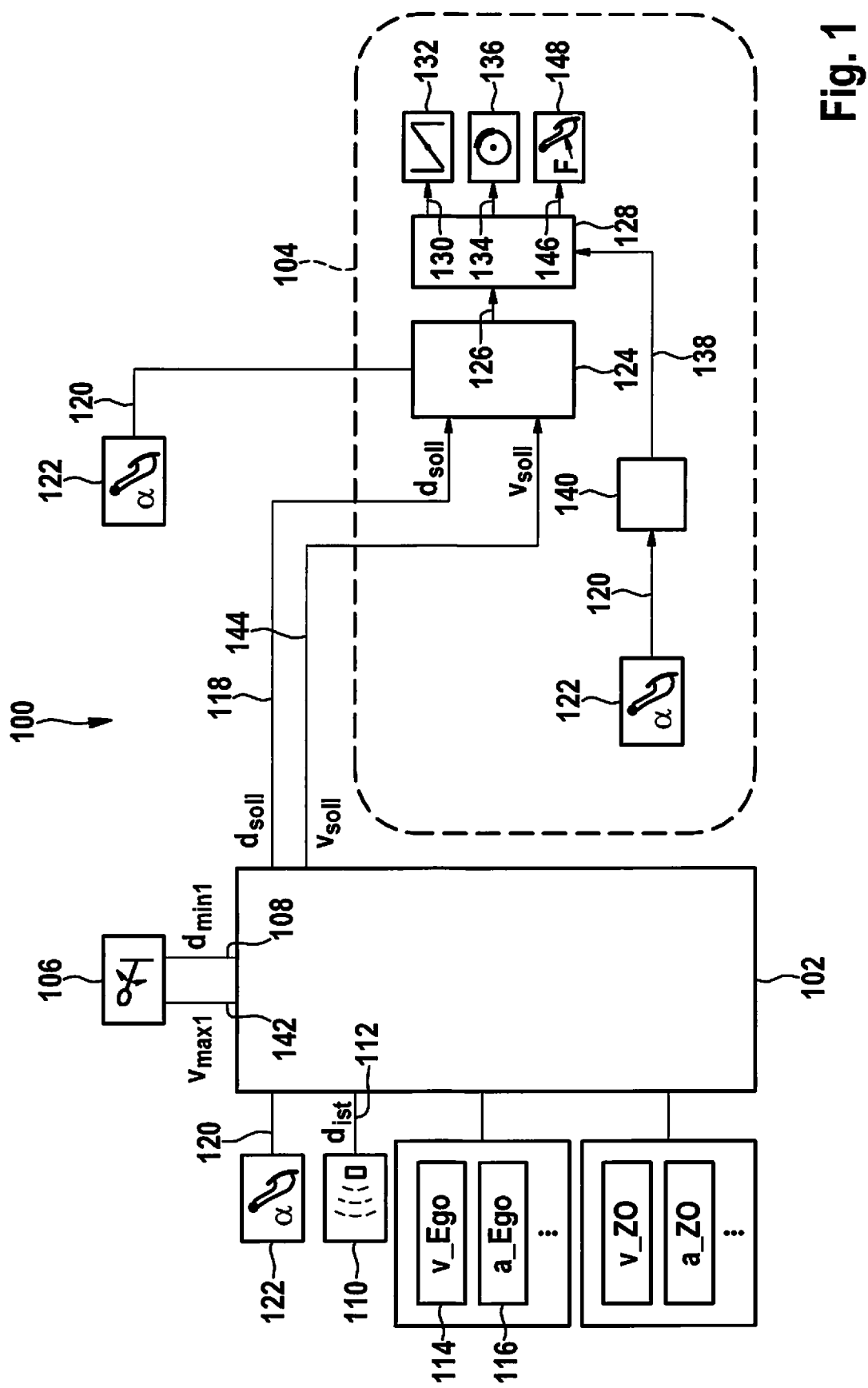
FIG. 1 shows a block diagram of a distance control system including a distance controller according to one exemplary embodiment.

FIG. 1 shows a block diagram of a distance control system 100. Distance control system 100 includes a distance controller 102 according to the approach presented here and an acceleration controller 104. Distance control system 100 is provided for a vehicle. The vehicle is referred to here as the ego vehicle. Distance controller 102 is designed for the purpose of carrying out a dynamic setpoint distance computation as a function of the driver intent. For this purpose, a reference value 108 for a distance of the ego vehicle to a preceding vehicle is input by an operating element 106 of the ego vehicle. The preceding vehicle is referred to here as the target vehicle. The actual instantaneous distance is measured by a distance sensor 110 of the ego vehicle and depicted in a distance value 112. Distance controller 102 inputs distance value 112. Further pieces of information may be obtained from a curve of distance value 112. A velocity of the target vehicle and/or an acceleration of the target vehicle may be inferred from the curve using a velocity of the ego vehicle depicted in a velocity value 114 and/or an acceleration of the ego vehicle depicted in an acceleration value 116.

Distance controller 102 inputs an accelerator pedal angle 120 of an accelerator pedal 122 of the ego vehicle to determine a distance target value 118. Distance target value 118 is determined using the input values. Distance target value 118 is transmitted to acceleration controller 104. An acceleration setpoint value 126 is computed in a computation unit 124 of acceleration controller 104 using distance target value 118 and accelerator pedal angle 120. Acceleration setpoint value 126 is input by an actuation unit 128 of acceleration controller 104. In actuation unit 128, acceleration setpoint value 126 is converted into a drive control signal 130 for a drive 132 of the vehicle and/or a brake signal 134 for a braking system 136 of the vehicle.

Actuation unit 128 furthermore inputs a deactivation signal 138 from a deactivation unit 140 of acceleration controller 104. Deactivation unit 140 monitors accelerator pedal angle 120. If accelerator pedal angle 120 at accelerator pedal 122 is changed at an angular velocity greater than a threshold value or the accelerator pedal angle exceeds a certain value, deactivation unit 140 outputs deactivation signal 138. The influence of distance 112 is deactivated in response to deactivation signal 138. If the driver carries out a kickdown, he exceeds, for example, an accelerator pedal angle to call up the greatest possible acceleration of the ego vehicle. He assumes the full control over the ego vehicle.

In one exemplary embodiment, the distance controller furthermore inputs a maximum velocity value 142 from operating element 106. Using maximum velocity value 142 and the other input variables, a velocity target value 144 is determined for acceleration controller 104. Acceleration setpoint value 126 is computed in computation unit 124 using velocity target value 144.

In one exemplary embodiment, an actuator signal 146 for an actuator 148 at accelerator pedal 122 is furthermore output by actuation unit 128. Actuator 148 acts against an operation direction of accelerator pedal 122. A haptic signal may be sent to the driver of the vehicle by actuator 148, for example, if actuation unit 128 activates braking system 136 of the vehicle via brake signal 134.

Figure 2:
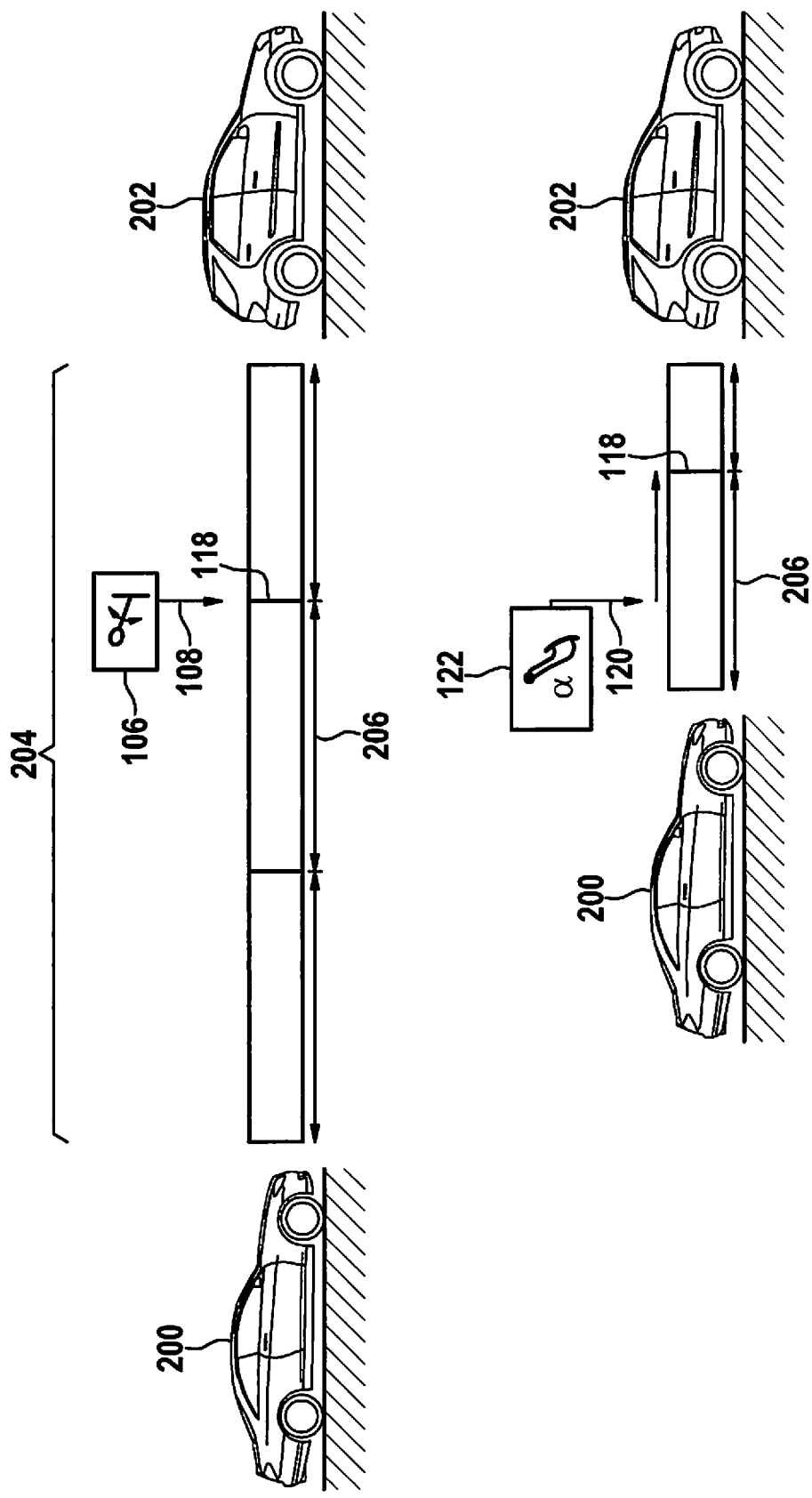
FIG. 2 shows illustrations of a vehicle including a distance controller according to one exemplary embodiment.

FIG. 2 shows illustrations of a vehicle 200 including a distance controller according to one exemplary embodiment. The distance controller essentially corresponds to the distance controller in FIG. 1. Vehicle 200 is referred to here as ego vehicle 200 and travels behind a preceding vehicle 202, which is referred to as target vehicle 202. Ego vehicle 200 is still far away from target vehicle 202 in an upper view and travels at a higher velocity than target vehicle 202. The velocity of ego vehicle 200 is determined by an instantaneous power delivery of a drive of ego vehicle 200. A power request for the drive is specified by a driver of ego vehicle 200 via accelerator pedal angle 120 at accelerator pedal 122 of ego vehicle 200. Distance 204 between vehicles 200, 202 decreases due to the differential velocity. Distance 204 is measured by at least one distance sensor of ego vehicle 200 and controlled by the distance controller. In order that ego vehicle 200 does not fall below velocity-dependent distance target value 118 to target vehicle 202, the distance controller reduces the power request from a velocity-dependent damping distance 206 to the target vehicle 202, independently of accelerator pedal angle 120, until distance 205 corresponds to distance target value 118 and both vehicles 200, 202 travel at the same velocity. Ego vehicle 200 is thus adjusted to distance target value 118.

The driver of ego vehicle 200 has set reference value 108 for distance target value 118 via operating element 106. Reference value 108 represents distance target value 118 as a time gap between vehicles 200, 202. The time gap corresponds to a duration which elapses until ego vehicle 200 drives over the same point which target vehicle 202 has previously driven over. Since ego vehicle 200 covers a greater distance per unit of time with increasing velocity, distance target value 118 also becomes greater with increasing velocity, although the specified time gap remains the same.

If the driver deems distance target value 118 to be excessively large in a present traffic situation, he may shorten distance 204 in the approach presented here. For this purpose, the driver may press down accelerator pedal 122 farther with adjusted distance target value 118. The distance controller registers changed accelerator pedal angle 120 and adapts distance target value 118, for example, proportionally to a change of accelerator pedal angle 120, as long as accelerator pedal 122 is pressed down more strongly. Distance target value 118 is reduced at minimum down to a minimum distance. If the driver reduces the pressure on accelerator pedal 122, the distance controller also registers this change of accelerator pedal angle 120 and increases distance target value 118 again, for example, proportionally to the change of accelerator pedal angle 120, until distance target value 118 originally set via operating element 106 is reached again.

In other words, FIG. 2 shows an illustration of a vehicle 200 including a distance controller according to one exemplary embodiment. The distance controller is designed to specify a distance target value 118 for a distance 204 between vehicle 200 and a preceding vehicle 202 as a function of an accelerator pedal angle 120 of an accelerator pedal 122 of vehicle 200.

The distance is adjusted to distance target value 118 by the distance controller of vehicle 200 using brake interventions and/or power adaptations of a drive of vehicle 200. To be able to control the distance, the distance controller inputs a distance value representing distance 204 of a distance sensor of vehicle 200.

Distance target value 118 is specified by the distance controller within a value range. An uninfluenced distance target value 118 is in particular the highest value of the value range. The value range may be a velocity-independent time gap range. The value range may also be velocity dependent. The value range then includes higher values at greater velocity than at low velocity. The value range is set by a driver of vehicle 200 via an operating element 106. Operating element 106 is formed here, for example, as an operating lever on the steering wheel of vehicle 200. Operating element 106 may also be formed as a rotary switch or as a menu of a vehicle controller.

If vehicle 200 approaches preceding vehicle 202, distance 204 decreases. If distance 204 approaches distance target value 118, the distance controller thus reduces the power request associated with instantaneous accelerator pedal angle 120 of accelerator pedal 122 by a power correction value in order to slow down vehicle 200 until a velocity of vehicle 200 approximately corresponds to a velocity of preceding vehicle 202 and distance 204 approximately corresponds to distance target value 118. If a differential velocity between vehicles 200, 202 is too great to be able to be equalized via the power request, a brake request is output to a braking system of vehicle 200 via a brake intervention value.

If the driver perceives adjusted distance 204 to be excessively large or not adapted to a present traffic situation, he will increase accelerator pedal angle 120 of accelerator pedal 122 or increase a pressure on accelerator pedal 122. This change is registered by the distance controller and distance target value 118 is reduced within the value range proportionally to the change. The increase of the power request accompanying the change is at least partially relayed to the drive of vehicle 200 as a result of reduced distance target value 118. Vehicle 200 shortens distance 204 and catches up to preceding vehicle 202 until new distance 204 again corresponds to distance target value 118.

Distance target value 118 is only slightly reduced in the event of a minor increase of accelerator pedal angle 120. In the event of a large increase of accelerator pedal angle 120, distance target value 118 is substantially reduced. Distance target value 118 remains within the selected value range, however. If the driver further reduces accelerator pedal angle 120, i.e., exerts less pressure on accelerator pedal 122, distance target value 118 is increased within the value range proportionally to the change of accelerator pedal angle 120.

In one exemplary embodiment, a change is made to a narrower value range in response to the increase of accelerator pedal angle 120. The narrower value range includes distance values which are closer to preceding vehicle 202. Greatest distance target value 118 of the narrower value range thus represents a lesser distance to preceding vehicle 202 than greatest distance target value 118 of the broader value range. Vehicle 200 thus travels closer as a whole to preceding vehicle 202.

To keep distance 204 corresponding to distance target value 118, the distance controller operates the braking system of vehicle 200. The narrower the value range, the greater are possible brake interventions of the distance controller to safely decelerate vehicle 200 without tailgating preceding vehicle 202.

An illustration is shown in which a distance 204 to preceding vehicle 202 is influenced according to the approach presented here. Vehicle 200 includes a distance controller as shown in FIG. 1, for example.

If distance 204 is greater than greatest distance target value 118 defined by a preselected value range, vehicle 200 may drive faster than preceding vehicle 202 and catch up to preceding vehicle 202.

If vehicle 200 has caught up to preceding vehicle 202 up to a distance 204 corresponding to distance target value 118, and the driver does not press more strongly on accelerator pedal 122, the distance controller keeps distance 204 constant at steady velocity. If the velocity decreases, vehicle 200 may approach more closely. If the velocity increases, the distance controller will increase distance 204.

If the driver perceives adjusted distance 204 to be excessively large and moderately increases the pressure on accelerator pedal 122, the distance controller reduces distance target value 118 accordingly within the value range.

In other words, a dynamic distance control and/or distance calculation is provided.

There are presently different driver assistance systems in vehicles. Inter alia, cruise control (CrCtl), longitudinal limiter (LLim), ALLim (advanced LLim), and adaptive cruise control (ACC) enhance the comfort and the safety for the driver. In addition, further assistance systems provide an increase in safety by way of distance warnings and emergency brake interventions.

In the approach presented here, a dynamic setpoint distance is computed. The minimum distance is computed differently as a function of various influencing variables. A time-gap-based minimum distance is used as the base, similarly to an adaptive cruise control. However, this minimum distance may be reduced upon approach of instantaneous distance 204 to the minimum distance or upon reaching the minimum distance, in particular if the driver requests it.

If the driver is limited with his/her vehicle to the minimum distance to the preceding vehicle and he/she intentionally wants to approach closer, for example, since the preceding vehicle is expected to turn, the traffic flow requires it, or for subjective reasons, he/she may reduce the minimum distance by increasing accelerator pedal angle 120. For example, the next smaller time gap or the smallest time gap may be selected.

The limiting function itself remains active, only the minimum distance and the acceleration thus released change. In order that the minimum distance remains at a safe amount, it may be reduced only down to a certain minimum distance (last time gap) by slowly increasing accelerator pedal angle 120.

For a further approach, a high accelerator pedal gradient or a deflection of accelerator pedal 122 similar to a kickdown is necessary to deactivate the system.

In addition to a consideration of the variables, such as accelerator pedal angle 120, differential velocity, and distance in relation to the minimum distance, geographic properties, such as uphill grades or curves, may also be taken into consideration.

The acceleration of preceding vehicle 202 may also result in different desired distances, because it is reasonable to catch up to and follow an accelerating vehicle 202, while it is reasonable to maintain a distance to a decelerating vehicle 202 (subjective desired distance).

A possibility for variance in the reduction of the preselected distance target value also results via the influencing factors, such as the acceleration of the target vehicle or also a radius of the traveled route. In one exemplary embodiment, the reduction of the preselected distance target value is less with an equal increase of the accelerator pedal angle on a straight expressway than in the case of a curving country road or in the city.

Enhanced flexibility results. Due to the use of additional input variables in the computation of the minimum distance, such as accelerator pedal 122 in particular, in addition to the safety and the comfort of a distance limiter, the driver has the option of adapting distance 204 to his/her present, personal condition, his/her requirements, and the traffic situation. This may be achieved by the consideration of the accelerator pedal behavior.

Enhanced sportiness and safety result due to the approach presented here. Due to the consideration of the accelerator pedal position, the dynamic distance computation offers the highest possible level of feedback to the driver. There is no pronounced dead zone, as in presently known implementations of a speed limiter, since an increase of accelerator pedal angle 120 also results in a vehicle acceleration. This is reduced to preserve the safety and the comfort, but it gives the driver the feeling of always specifying the vehicle behavior.

In addition, if the driver does not want any limit, he/she may thus temporarily deactivate the function by way of a high accelerator pedal gradient or a high accelerator pedal value (intentional acceleration request).

An easily comprehensible behavior results for the driver, since he/she himself/herself is always responsible for the acceleration and distance 204 (within certain limits) and he/she may adapt them to his/her driving style and the driving situation. By way of an intentional change of accelerator pedal 122, he/she experiences a reaction of vehicle 200. The necessity for interactions with an operating lever 106 is thus noticeably reduced.

The approach presented here may be implemented particularly simply by a software change of the engine controller and the radar control unit in vehicles, in which an adaptive cruise control or a similar system is installed.

Finally, it is to be noted that terms such as "having", "including", etc. do not exclude other elements or steps and terms such as "a" or "one" do not exclude multiples.

What is claimed is:

1. A method for controlling a distance of a vehicle to a preceding or target vehicle, the method comprising:
    limiting, using a distance control system, the distance to a preselected distance target value; and
    setting a dynamic distance target value using an item of information about a change of an accelerator pedal angle;
    wherein the distance control system includes a distance controller and an acceleration controller,
    wherein the distance controller uses the accelerator pedal angle of an accelerator pedal of the vehicle to determine the dynamic distance target value,
    wherein the dynamic distance target value is transmitted to the acceleration controller, wherein an acceleration setpoint value is computed in a computation unit of the acceleration controller using the dynamic distance target value and the accelerator pedal angle,
    wherein an acceleration setpoint value is input by an actuation unit of the acceleration controller, and
    wherein in the actuation unit, the acceleration setpoint value is converted into a drive control signal for a drive of the vehicle and/or a brake signal for a braking system of the vehicle,
    wherein the actuation unit inputs a deactivation signal from a deactivation unit of the acceleration controller, wherein the deactivation unit monitors the accelerator pedal angle,
    wherein if the accelerator pedal angle at the accelerator pedal is changed at an angular velocity greater than a threshold value, the deactivation unit outputs a deactivation signal, so that an influence of the distance controller is deactivated in response to the deactivation signal, and
    wherein the vehicle does not fall below a velocity-dependent distance target value to a target vehicle, the distance controller reduces the power request from a velocity-dependent damping distance to the target vehicle, independently of the accelerator pedal angle, until the distance corresponds to the distance target value and both the vehicle and the target vehicle travel at the same velocity, so that the vehicle is adjusted to the distance target value.

2. The method as recited in claim 1, further comprising:
    presetting a dynamic distance target value using a reference value for the distance target value input by an operating element of the vehicle.

3. The method as recited in claim 2, wherein, in the presetting, the dynamic distance target value is preset using a time gap value as the reference value, and wherein the time gap value represents a duration which elapses until the vehicle passes a same point as a preceding vehicle.

4. The method as recited in claim 2, wherein, in the presetting, the reference value is changed by a predefined step if a gradient of the accelerator pedal angle is greater than a threshold value.

5. The method as recited in claim 1, wherein, in the setting, the dynamic distance target value is reduced if the accelerator pedal angle is increased.

6. The method as recited in claim 1, wherein, in the setting, the dynamic distance target value is increased if the accelerator pedal angle is decreased.

7. The method as recited in claim 1, wherein, in the setting, an intervention leeway is specified for an actuation unit of the vehicle using the dynamic distance target value.

8. A distance control system for controlling a distance of a vehicle to a preceding or target vehicle, comprising:
a first unit, which is a distance controller for limiting the distance to a preselected distance target value; and
a second unit, which is an acceleration controller for setting the dynamic distance target value using an item of information about a change of an accelerator pedal angle;
wherein the distance controller uses the accelerator pedal angle of an accelerator pedal of the vehicle to determine the dynamic distance target value,
wherein the dynamic distance target value is transmitted to the acceleration controller, wherein an acceleration setpoint value is computed in a computation unit of the acceleration controller using the dynamic distance target value and the accelerator pedal angle,
wherein an acceleration setpoint value is input by an actuation unit of the acceleration controller, and
wherein in the actuation unit, the acceleration setpoint value is converted into a drive control signal for a drive of the vehicle and/or a brake signal for a braking system of the vehicle,
wherein the actuation unit inputs a deactivation signal from a deactivation unit of the acceleration controller, wherein the deactivation unit monitors the accelerator pedal angle, and
wherein if the accelerator pedal angle at the accelerator pedal is changed at an angular velocity greater than a threshold value, the deactivation unit outputs a deactivation signal, so that an influence of the distance controller is deactivated in response to the deactivation signal, and
wherein the vehicle does not fall below a velocity-dependent distance target value to a target vehicle, the distance controller reduces the power request from a velocity-dependent damping distance to the target vehicle, independently of the accelerator pedal angle, until the distance corresponds to the distance target value and both the vehicle and the target vehicle travel at the same velocity, so that the vehicle is adjusted to the distance target value.

9. A non-transitory computer readable medium having a computer program, which is executable by a processor, comprising:
a program code arrangement having program code for controlling a distance of a vehicle to a preceding or target vehicle, by performing the following:
limiting the distance to a preselected distance target value; and
setting the dynamic distance target value using an item of information about a change of an accelerator pedal angle;
wherein the distance control system includes a distance controller and an acceleration controller,
wherein the distance controller uses the accelerator pedal angle of an accelerator pedal of the vehicle to determine the dynamic distance target value,
wherein the dynamic distance target value is transmitted to the acceleration controller, wherein an acceleration setpoint value is computed in a computation unit of the acceleration controller using the dynamic distance target value and the accelerator pedal angle,
wherein an acceleration setpoint value is input by an actuation unit of the acceleration controller, and
wherein in the actuation unit, the acceleration setpoint value is converted into a drive control signal for a drive of the vehicle and/or a brake signal for a braking system of the vehicle,
wherein the actuation unit inputs a deactivation signal from a deactivation unit of the acceleration controller, wherein the deactivation unit monitors the accelerator pedal angle, and
wherein if the accelerator pedal angle at the accelerator pedal is changed at an angular velocity greater than a threshold value, the deactivation unit outputs a deactivation signal, so that an influence of the distance controller is deactivated in response to the deactivation signal, and
wherein the vehicle does not fall below a velocity-dependent distance target value to a target vehicle, the distance controller reduces the power request from a velocity-dependent damping distance to the target vehicle, independently of the accelerator pedal angle, until the distance corresponds to the distance target value and both the vehicle and the target vehicle travel at the same velocity, so that the vehicle is adjusted to the distance target value.

10. The computer-readable medium of claim 9, further comprising:
presetting the distance target value using a reference value for the dynamic distance target value input by an operating element of the vehicle;
wherein, in the presetting, the dynamic distance target value is preset using a time gap value as the reference value, and wherein the time gap value represents a duration which elapses until the vehicle passes a same point as a preceding vehicle.

* * * * *